United States Patent
Vidyadhara et al.

(10) Patent No.: US 9,830,457 B2
(45) Date of Patent: Nov. 28, 2017

(54) UNIFIED EXTENSIBLE FIRMWARE INTERFACE (UEFI) CREDENTIAL-BASED ACCESS OF HARDWARE RESOURCES

(71) Applicant: Dell Products, L.P., Round Rock, TX (US)

(72) Inventors: Sumanth Vidyadhara, Bangalore (IN); Chandrasekhar Puthillathe, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 108 days.

(21) Appl. No.: 14/703,912

(22) Filed: May 5, 2015

(65) Prior Publication Data
US 2016/0328564 A1    Nov. 10, 2016

(51) Int. Cl.
*H04L 29/06*  (2006.01)
*G06F 21/57*  (2013.01)

(52) U.S. Cl.
CPC ...... *G06F 21/575* (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

| | | | | |
|---|---|---|---|---|
| 8,031,937 B2 * | 10/2011 | Rasmusson | ............ | G06T 11/40 345/420 |
| 8,201,239 B2 * | 6/2012 | Smith | ................... | G06F 21/575 713/189 |
| 8,490,116 B2 * | 7/2013 | Ueltschey, III | ..... | G06F 9/45508 719/323 |
| 8,499,142 B1 * | 7/2013 | Ramamurthy | ........ | G06F 9/4406 713/1 |
| 9,021,244 B2 * | 4/2015 | Bobzin | ................. | G06F 21/575 713/1 |
| 9,372,699 B2 * | 6/2016 | Bobzin | ................. | G06F 21/572 |
| 9,660,807 B2 * | 5/2017 | Lewis | ................... | H04L 9/0891 |
| 2002/0173294 A1 * | 11/2002 | Nemeth | ............ | H04M 1/72525 455/412.1 |
| 2007/0016766 A1 * | 1/2007 | Richmond | .............. | G06F 21/57 713/100 |
| 2009/0319806 A1 * | 12/2009 | Smith | ................... | G06F 21/575 713/193 |

(Continued)

OTHER PUBLICATIONS

UEFI, UEFI Specification 2.4, Jun. 2013, <http://www.uefi.org/sites/default/files/resources/UEFI_2.4.pdf>.*

*Primary Examiner* — David Garcia Cervetti
(74) *Attorney, Agent, or Firm* — Fogarty LLP

(57) ABSTRACT

Systems and methods for Unified Extensible Firmware Interface (UEFI) credential-based access of hardware resources. In an illustrative, non-limiting embodiment, an Information Handling System (IHS) may include a processor and a memory coupled to the processor, the memory having program instructions stored thereon that, upon execution by the processor, cause the IHS to: receive a credential for a given one of a plurality of users; and store the credential, where the credential is retrievable via a UEFI Device Path Protocol as part of a determination of whether the given user has access to a given one of a plurality of devices within the IHS, and where the given device is accessible via a UEFI Device Path.

18 Claims, 2 Drawing Sheets

(56) References Cited

U.S. PATENT DOCUMENTS

| | | | | |
|---|---|---|---|---|
| 2009/0327741 A1* | 12/2009 | Zimmer | ................ | G06F 21/575 713/183 |
| 2010/0042821 A1* | 2/2010 | Harmer | ................ | G06F 9/4411 713/2 |
| 2010/0083002 A1* | 4/2010 | Cui | ....................... | G06F 21/575 713/189 |
| 2010/0169631 A1* | 7/2010 | Yao | ........................... | G06F 9/44 713/2 |
| 2011/0035515 A1* | 2/2011 | Quach | ................... | G06F 9/4406 710/38 |
| 2011/0138166 A1* | 6/2011 | Peszek | ................. | G06F 21/575 713/2 |
| 2011/0302444 A1* | 12/2011 | Tashima | .............. | G06F 11/1417 714/2 |
| 2012/0136888 A1* | 5/2012 | Mahmoud | ............. | G06F 9/4413 707/769 |
| 2012/0137112 A1* | 5/2012 | Bolen | ............... | G06F 17/30029 713/1 |
| 2012/0180076 A1* | 7/2012 | Shutt | ..................... | G06F 9/4411 719/327 |
| 2012/0297099 A1* | 11/2012 | Kochar | ................. | G06F 13/102 710/104 |
| 2013/0124843 A1* | 5/2013 | Bobzin | ................. | G06F 21/575 713/2 |
| 2014/0025941 A1* | 1/2014 | Bulusu | ................. | G06F 9/4401 713/2 |
| 2014/0331037 A1* | 11/2014 | Lewis | ................... | G06F 9/4401 713/2 |
| 2015/0074386 A1* | 3/2015 | Huang | ................. | G06F 9/4401 713/2 |
| 2015/0074387 A1* | 3/2015 | Lewis | ................... | G06F 21/575 713/2 |
| 2016/0328564 A1* | 11/2016 | Vidyadhara | ........... | G06F 21/575 |

* cited by examiner

UNIFIED EXTENSIBLE FIRMWARE INTERFACE (UEFI) CREDENTIAL-BASED ACCESS OF HARDWARE RESOURCES

FIELD

This disclosure relates generally to computer systems, and more specifically, to systems and methods for Unified Extensible Firmware Interface (UEFI) credential-based access of hardware resources.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and/or networking systems.

A Basic Input/Output System (BIOS) is a type of firmware used during the booting process (reset or startup) of an IHS that contains the first software that is executed when the IHS is powered on. In operation, the BIOS is configured to initialize and test the IHS's hardware components, and also to load a boot loader or an Operating System (OS) from a memory. Originally, BIOS firmware was stored in a read-only memory (ROM) chip in the IHS; in modern systems, however, the BIOS' instructions are stored on flash memory so they can be rewritten without having to physically remove the chip from the IHS.

The Unified Extensible Firmware Interface (UEFI) was designed as a successor to BIOS, aiming to address certain of its technical shortcomings. In UEFI based-systems, actions performed upon the UEFI file system may use the UEFI Device Path Protocol. Particularly, UEFI file systems use the UEFI Device Path Protocol internally to install UEFI applications, to access hardware using UEFI drivers, and/or to determine the programmatic path to a device.

Despite technological advances provided by UEFI firmware, the inventors hereof have identified a number of shortcomings that are characteristic of conventional UEFI systems. For example, the UEFI Device Path Protocol does not protect an IHS against malicious access from users. Any malicious UEFI application, shell, driver, or OS Loader can potentially corrupt the system hardware once they gain access to it. Accordingly, to address these and other problems, the inventors hereof have developed systems and methods for UEFI credential-based access of hardware resources.

SUMMARY

Embodiments of systems and methods for Unified Extensible Firmware Interface (UEFI) credential-based access of hardware resources are described herein. In an illustrative, non-limiting embodiment, an Information Handling System (IHS) may include a processor and a memory coupled to the processor, the memory having program instructions stored thereon that, upon execution by the processor, cause the IHS to: receive a credential for a given one of a plurality of users; and store the credential, wherein the credential is retrievable via a Unified Extensible Firmware Interface (UEFI) Device Path Protocol as part of a determination of whether the given user has access to a given one of a plurality of devices within the IHS, and wherein the given device is accessible via a UEFI Device Path.

In various implementations, the credential is independent of the given user's administrative authority or lack thereof with respect to the IHS. The credential may be received during a login portion of a boot service and/or via a runtime service after completion of the boot service. The IHS may be configured to receive a request originated by the given user to retrieve the UEFI Device Path of the given device, and the request may be part of an action upon an UEFI file system, UEFI shell, UEFI application, or UEFI driver.

The IHS may be configured to retrieve the UEFI Device Path in response to the credential indicating that the given user has access to the given device. Retrieval of the UEFI Device Path occurs independently of any authentication or validation operation for the given device using a Secure Boot process. Additionally or alternatively, the IHS may be configured to retrieve a file other than the UEFI Device Path in response to the credential indicating that the given user does not have access to the given device. Again, retrieval of the file occurs independently of any authentication or validation operation for the given device using a Secure Boot process. The file may prevent a NULL value from being returned in response to the request, and the IHS may be further configured to receive another request from the given user to delete the file and not fulfill the other request.

In another illustrative, non-limiting embodiment, a method may be performed in an IHS having a processor and a memory coupled to the processor, the memory having program instructions stored thereon that, upon execution by the processor, configure the IHS to provide UEFI credential-based access of hardware resources. The method may include storing a credential for a given one of a plurality of users; retrieving the credential in response to the given user's request to access a given one of a plurality of devices within the IHS; determining that given user is authorized to access to a given one of a plurality of devices within the IHS based upon the credential; and in response to the determination, providing a UEFI Device Path for the given device to the user, wherein the UEFI Device Path is authenticated independently of any authentication or validation of the given device using a Secure Boot process.

In yet another illustrative, non-limiting embodiment, a memory device may have program instructions stored thereon that, upon execution by a processor of an IHS, cause the IHS to: receive a request originated by a given one of a plurality of users to access a given one of a plurality of devices within the IHS, wherein the given device is accessible using an authenticated UEFI Device Path for the given device; determine that the given user is not associated with a credential that authorizes access to the given device independently of a Secure Boot process; and in response to the determination, retrieve information other than the authenticated UEFI Device Path.

BRIEF DESCRIPTION OF THE DRAWINGS

The present invention(s) is/are illustrated by way of example and is/are not limited by the accompanying figures.

DETAILED DESCRIPTION

Systems and methods for Unified Extensible Firmware Interface (UEFI) credential-based access of hardware resources are described herein. In the following detailed description of embodiments of the disclosure, specific embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, component, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
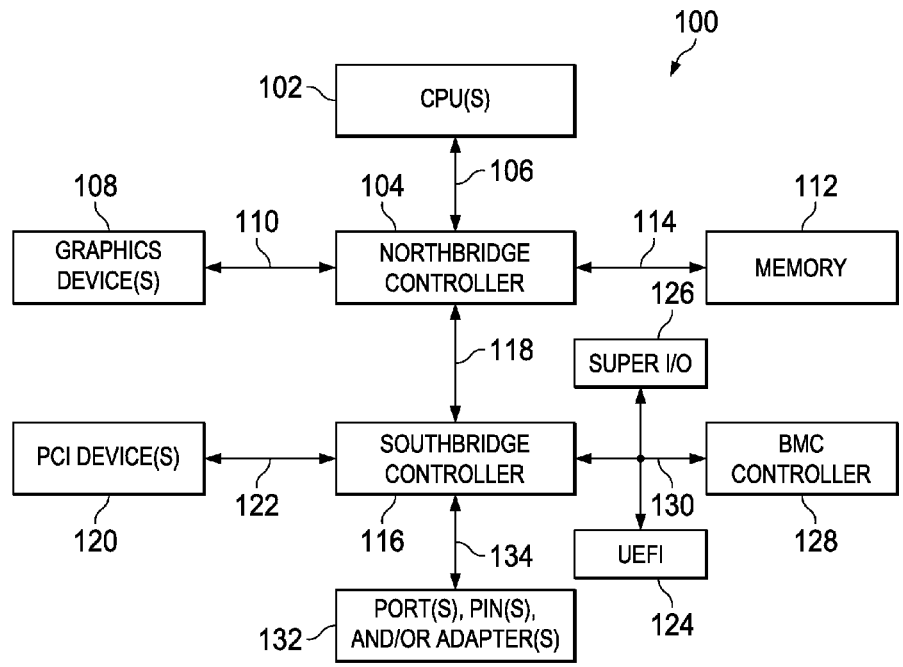
FIG. 1 is a block diagram illustrating an example of an Information Handling System (IHS) configured to implement Unified Extensible Firmware Interface (UEFI) credential-based access of hardware resources according to some embodiments.

FIG. 1 is a block diagram illustrating an example of an IHS configured to implement Unified Extensible Firmware Interface (UEFI) credential-based access of hardware resources according to some embodiments. As shown, IHS 100 includes one or more CPUs 102. In various embodiments, IHS 100 may be a single-processor system including one CPU 102, or a multi-processor system including two or more CPUs 102 (e.g., two, four, eight, or any other suitable number). CPU(s) 102 may include any processor capable of executing program instructions. For example, in various embodiments, CPU(s) 102 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) 102 are coupled to northbridge controller or chipset 104 via front-side bus 106. Northbridge controller 104 may be configured to coordinate I/O traffic between CPU(s) 102 and other components. For example, in this particular implementation, northbridge controller 104 is coupled to graphics device(s) 108 (e.g., one or more video cards, controllers, or adaptors, etc.) via graphics bus 110 (e.g., an Accelerated Graphics Port or AGP bus, a Peripheral Component Interconnect or PCI bus, etc.). Northbridge controller 104 is also coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 is coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 124. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other device suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 is further coupled to one or more PCI devices 120 (e.g., network cards, sound cards, video cards, etc.) via PCI bus 132. Southbridge controller 116 is also coupled to Unified Extensible Firmware Interface (UEFI) firmware 124, Super I/O Controller 126, and Baseband Management Controller (BMC) 128 via Low Pin Count (LPC) bus 110.

UEFI 124 includes non-volatile memory having program instructions stored thereon. Those instructions may be usable CPU(s) 102 to initialize and test other hardware components and/or to load an Operating System (OS) onto IHS 100. As such, UEFI 124 may include a firmware interface that allows CPU(s) 102 to load and execute certain operations.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the UEFI's interface to initialize and test components of IHS 100.

Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 112. Generally speaking, a computer-accessible memory device may include any tangible, non-transitory storage media or memory media such as electronic, magnetic, or optical media—e.g., magnetic disk, a hard drive, a CD/DVD-ROM, a Flash memory, etc.—coupled to IHS 100 via northbridge controller 104 and/or southbridge controller 116.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of physical storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following an Intel® architecture, various systems and methods described herein may be adapted to work with any other chipset and/or BMC configuration.

In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be enclosed within a chassis or the like.

A person of ordinary skill in the art will recognize that IHS 100 of FIG. 1 is only an example of a system in which the present embodiments may be utilized. Indeed, the present embodiments may be used in various other types of electronic devices.

Figure 2:
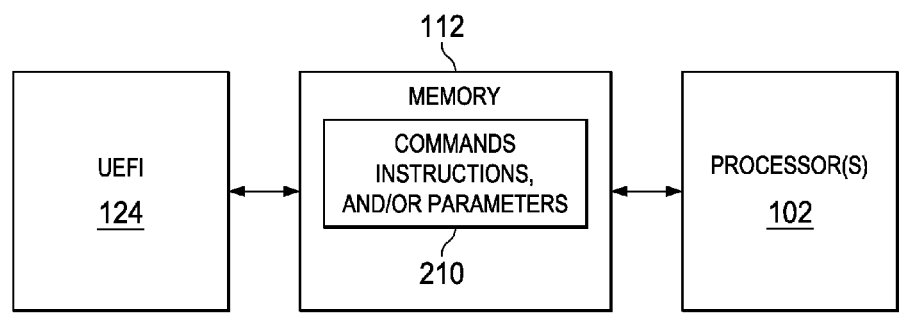
FIG. 2 illustrates an example of UEFI parameters, instructions, and/or commands being transmitted from an UEFI to a processor according to some embodiments.

With reference now to FIG. 2, there is illustrated an embodiment of parameters, instructions, and/or commands 210 transmitted between UEFI 124 and processor(s) 102. In some embodiments, one or more of UEFI configuration parameters, instructions, and/or commands 210 may be received from a user. For sake of illustration, for example, configuration parameters 210 may include a selection of which of CPU cores should be enabled within processor(s) 102. As such, those parameters may be stored in memory 112, for instance, following the Advanced Configuration and Power Interface (ACPI) specification.

In addition, parameters 210 may include data usable by a UEFI Device Path Protocol. Generally speaking, the UEFI Device Path Protocol provides a data structure description of where a device is in IHS 100. Each boot device, logical device, and image within IHS 100 may be described by a Device Path. A Device Path is a series of records (or "nodes") that describe the logical path from the software running on processor(s) 102 through the various IHS buses (e.g., PCI and USB) and industry standard protocols (e.g., SCSI or IPv4) until it reaches the logical or physical device itself. As such, configuration parameters 210 may maintain a mapping between device paths and a handle associated with a given device. To illustrate an example of a Device Path, consider the following hypothetical path:

PciRoot(0)/PCI(1,0)/SAS(0x31000004CF13F6BD, 0, SAS)

The foregoing Device Path refers to a SAS (Serial-Attached SCSI) device attached to a SAS controller PCI device on device 1, function 0 on the first PCI root bus in IHS 100. That device is further identified by 0x31000004cf13f6b (the SAS address), 0 (the SAS unit number) and the keyword SAS which refers to how the device has been configured. Using the LocateDevicePath( ) operation provided by UEFI, processor(s) 102 may obtain the Device Path and, once in possession of the Device Path, processor(s) 102 may perform one or more operations upon the identified device. Examples of such operations include, but are not limited to, action(s) upon an UEFI file system, UEFI shell, UEFI application, or UEFI driver.

In some embodiments, the UEFI Device Path Protocol may accommodate different types of Device Paths including, for example, a Hardware Device Path, an ACPI Device Path, a Messaging Device Path, a Media Device Path, a BIOS Boot Specification Device Path, and an End of Hardware Device Path.

A Hardware Device Path defines how a device is attached to the resource domain of IHS 100, where resource domain is simply the shared memory, memory mapped I/O, and I/O space of IHS 100. An ACPI Device Path is used to describe devices whose enumeration is not described in an industry-standard fashion. A Messaging Device Path is used to describe the connection of devices outside the resource domain of IHS 100. This Device Path can describe physical messaging information such as a SCSI ID, or abstract information such as networking protocol IP addresses. A Media Device Path is used to describe the portion of a medium that is being abstracted by a boot service. For example, a Media Device Path may define which partition on a hard drive is being used. A BIOS Boot Specification Device Path is used to point to boot legacy operating systems. And an End of Hardware Device Path may be used to indicate the end of the Device Path instance or Device Path structure.

As previously noted, conventional UEFI Device Path Protocols do not protect an IHS against malicious access from users. Any malicious UEFI application, shell, driver, or OS Loader can potentially corrupt the IHS. Moreover, this problem is independent of the application of a Secure Boot (or other similar) feature present in existing OS loaders and/or UEFI firmware.

The Secure Boot feature is intended to ensure that an IHS boots using only software that is trusted by the IHS manufacturer. Under the Secure Boot protocol, when IHS 100 starts, UEFI 124 checks the signature of each piece of boot software, including firmware drivers (Option ROMs) and the OS. If the signatures are correctly validated, IHS 100 boots and UEFI 124 yields control to the OS. Nonetheless, the Secure Boot protocol is not capable of granting or denying access to a particular device by an individual user based on that individual user's credentials with respect to that device (or group of devices), for example.

Furthermore, these issues are not properly addressed by conventional user identity verification protocols, which work to authenticate a user's access to IHS 100 based on a user password and/or biometric information. Using only these methods, once a user is logged in, he or she has access to all devices in IHS 100 without any user-level authentication of any UEFI Device Paths.

In some embodiments of systems and methods described herein, the implementation of authenticated UEFI Device Paths for particular users is independent of whether those users has administrative privileges with respect to IHS 100. For instance, even if an administrator successfully logs into IHS 100 (e.g., with a password or biometrics) and then boots the system with all software authenticated via Secure Boot and starts an FTP application enabled for all ports, that application can still be flooded with Deny services from different clients, and these requests should not be allowed to run without additional security procedures. Again, these problems can occur despite the use of identity verification protocols and/or Secure Boot. Thus, to address these types of problems, various techniques for implementing UEFI credential-based access of hardware resources are described below.

In some embodiments, during UEFI Boot Service, user configuration privileges or credentials may be stored using a UserAuthenticateDevicePathProtocol( ) routine. This function is configured to cause privilege types to be stored for access to a selected Device Path. Any Device Path access from UEFI subsystems or from an OSLoader can then use this protocol privilege type added in a Device Path structure and the Permissions in a Device Path Node structure. A DevicecPathProtocol( ) routine checks if the user is privileged to handle the UEFI DevicePath actions (e.g., delete a file, a partition, etc.).

A DevicePathProtocol( ) routine checks check if the current Device Path requested by a given user has any privileges set. If so, DevicePathProtocol( ) may use UserAuthenticateDevicePathProtocol( ) to check on Privileges for that requesting user. In some cases, if the privilege command lists the user as "NotAuthenticated," the DevicePathProtocol( ) routine may retrieve a file in that path for that user, so that the "NULL" value is not returned. In some implementations, the user may not be allowed to delete this file.

Any UEFI Core Libraries, such as UEFI file systems, shell and drivers can make use of UserAuthenticateDevicePathProtocol( ) to add security enforcements within their modules. User privileges/profiles can be added or updated dynamically using UEFI credential protocol to support newer Device Path credentials to be supported by the UserAuthenticateDevicePathProtocol( ), which may be used with additional authentications such as SmartCard, RFID, BioMetric etc.

In post-boot operation, a new EFI Runtime service may be registered as a new API. The EFI-Runtime Service may access the system's ConfigTable to add the UserAuthenticateDevicePathProtocol( ). The OS may save the UserLogin credential and may invoke the EFI-Runtime Service. A register saves the UserLogin Credentials and also associated privileges for that user to access RuntimeServices( ) using the UserAuthenticate Device Path Protocol( ).

Figure 3:
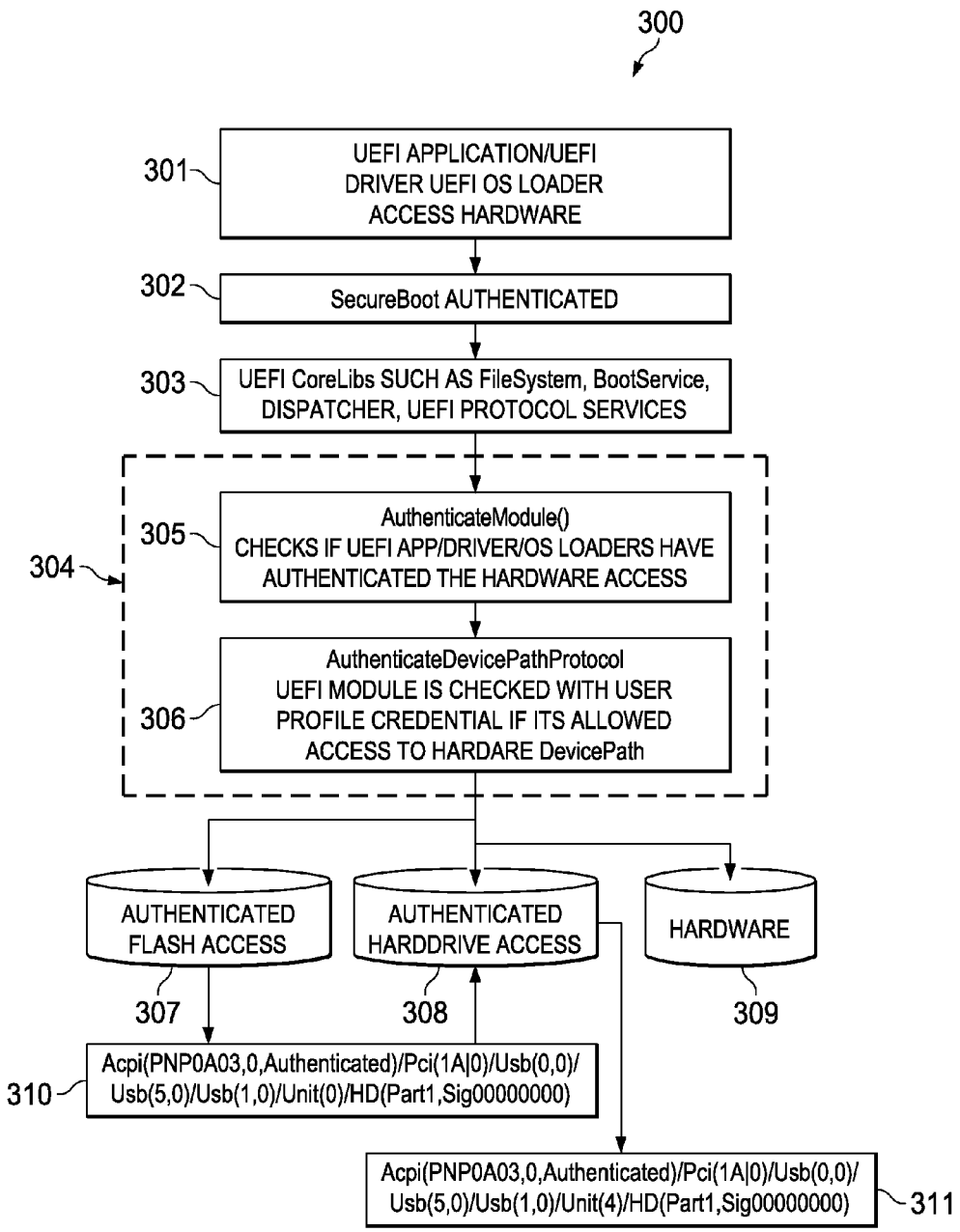
FIG. 3 is a flowchart of an example of a method for UEFI credential-based access of hardware resources according to some embodiments.

FIG. 3 is a flowchart illustrating an example of method 300 for UEFI credential-based access of hardware resources. In the discussion of FIG. 3, reference is also made to various components illustrated in FIGS. 1 and 2. In some embodiments, method 300 may be performed, at least in part, by UEFI 124 and/or processor control logic 120.

At block 301, a UEFI application, UEFI driver, or UEFI OS loader may attempt or request to access a hardware device within IHS 100, for example, in response to a command initiated by a given user. At block 302, the Secure Boot protocol is executed to ensure that the target device and its drivers, etc., are trusted by the manufacturer or the IHS. After block 302 is successfully completed, block 303 initiates UEFI core libraries, such as filesystem, bootservice, dispatcher, and UEFI protocol services.

Block 304 includes a procedure for checking whether an authenticated Device Path should be returned by the UEFI system in response to the access request. Particularly, in block 305, an AuthenticateModule( ) routine determines that the UEFI application, driver, or OS loader has authenticated the hardware access. Then, in response to the determination, the AuthetnicateDevicePathProtocol( ) routine checks the UEFI module to determine whether the user's credential allows the user to access the hardware device via the device's authenticated Device Path. If so, block 307 allows the user to access a flash memory, block 308 allows the user to access a hard drive, and/or block 309 allows the user to access some other hardware device. Blocks 310 and 311 are shown to illustrate examples of authenticated Device Paths retrieved (containing an "authenticated" string) in response to the user's credentials allowing the user to access devices 307-309.

As such, method 300 may enable profile, privilege, or credential-based access of system resources in UEFI systems using a new: UserAuthenticateDevicePathProtocol( ) and a DellDevicePathProtocol( ). When implementing these systems and methods, an IHS may be protected from malware in UEFI System firmware from Post and Pre-OS, even when SecureBoot is vulnerable to malware. Users may have their privileges changed dynamically to access system resources using the UserAuthenticateDevicePathProtocol( ). In some cases, access from OS to UEFI Subsystem using UEFI Runtime service may be based on User Privileges only. Moreover, privileges may be enabled for each UEFI Device Path based upon each user's credentials.

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by a person of ordinary skill in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a processor; and
a memory coupled to the processor, the memory having program instructions stored thereon that, upon execution by the processor, cause the IHS to:
receive a credential provided by a given user of a plurality of users of the IHS, wherein the credential indicates whether the user has access to a given device among a plurality of devices coupled to the IHS;
receive a request by the given user to access the given device; and
at least one of:
(a) allow the user to access the given device by determining that a hardware Unified Extensible Firmware Interface (UEFI) Device Path corresponding to the request carries an authentication parameter indicating that the given user has provided the credential; or
(b) prevent the user from accessing the given device by determining that the hardware UEFI Device Path does not carry the authentication parameter.

2. The IHS of claim 1, wherein the credential is independent of the given user's administrative authority or lack thereof with respect to the IHS.

3. The IHS of claim 1, wherein the credential is received during a login portion of a boot service.

4. The IHS of claim 1, wherein the credential is received via a runtime service after completion of a boot service.

5. The IHS of claim 1, wherein the program instructions, upon execution by the processor, further cause the IHS to receive a request originated by the given user to retrieve the UEFI Device Path of the given device.

6. The IHS of claim 5, wherein the request is part of an action upon an UEFI file system, UEFI shell, UEFI application, or UEFI driver.

7. The IHS of claim 5, wherein retrieval of the UEFI Device Path occurs independently of any authentication or validation operation for the given device using a Secure Boot process.

8. The IHS of claim 5, wherein the program instructions, upon execution by the processor, further cause the IHS to retrieve a file other than the UEFI Device Path in response to the credential indicating that the given user does not have access to the given device.

9. The IHS of claim 8, wherein the retrieval of the file occurs after any authentication or validation operation for the given device using a Secure Boot process.

10. The IHS of claim 8, wherein the file prevents a NULL value from being returned in response to the request.

11. The IHS of claim 8, wherein the program instructions, upon execution by the processor, further cause the IHS to:
receive another request from the given user to delete the file; and
not fulfill the other request.

12. In an Information Handling System (IHS), a method comprising:
receiving a credential provided by a given user of a plurality of users of the IHS, wherein the credential indicates whether the user has access to a given device among a plurality of devices coupled to the IHS;
receiving a request by the given user to access the given device; and
at least one of:
(a) allowing the user to access the given device by determining that a hardware Unified Extensible Firmware Interface (UEFI) Device Path corresponding to the request carries an authentication parameter indicating that the given user has provided the credential; or
(b) preventing the user from accessing the given device by determining that the hardware UEFI Device Path does not carry the authentication parameter.

13. The method of claim 12, wherein the credential is independent of the given user's administrative authority or lack thereof with respect to the IHS.

14. The method of claim 12, wherein the credential is received during a login portion of a boot service.

15. The method of claim 12, wherein the credential is received via a runtime service after completion of a boot service.

16. A memory device having program instructions stored thereon that, upon execution by a processor of an Information Handling System (IHS), cause the IHS to:
receive a credential provided by a given user of a plurality of users of the IHS, wherein the credential indicates whether the user has access to a given device among a plurality of devices coupled to the IHS;
receive a request by the given user to access the given device; and
at least one of:
(a) allow the user to access the given device by determining that a hardware Unified Extensible Firmware Interface (UEFI) Device Path corresponding to the request carries an authentication parameter indicating that the given user has provided the credential; or
(b) prevent the user from accessing the given device by determining that the hardware UEFI Device Path does not carry the authentication parameter.

17. The memory device of claim 16, wherein the request is part of an action upon an UEFI file system, UEFI shell, UEFI application, or UEFI driver.

18. The memory device of claim 16, wherein the program instructions, upon execution by the processor, further cause the IHS to:
receive another request from the given user to delete the information; and
not fulfill the other request.

* * * * *